United States Patent
Inuzuka

(10) Patent No.: US 6,840,621 B2
(45) Date of Patent: Jan. 11, 2005

(54) DYEING SYSTEM FOR LENS AND ORDERING SYSTEM FOR COLORED LENS

(75) Inventor: Minoru Inuzuka, Aichi (JP)

(73) Assignee: Nidek Co., Ltd., Gamagori (JP)

( * ) Notice: Subject to any disclaimer, the term of this patent is extended or adjusted under 35 U.S.C. 154(b) by 1 day.

(21) Appl. No.: 10/253,478

(22) Filed: Sep. 25, 2002

(65) Prior Publication Data

US 2003/0063256 A1 Apr. 3, 2003

(30) Foreign Application Priority Data

Sep. 28, 2001 (JP) ........................................ 2001-304310

(51) Int. Cl.$^7$ .............................. G02C 7/02; D06P 5/00
(52) U.S. Cl. .......................................... 351/177; 8/506
(58) Field of Search ................................ 351/177, 162, 351/163–165, 160 R, 160 H, 41, 44, 159; 8/506–507, 509

(56) References Cited

U.S. PATENT DOCUMENTS

| | | | | |
|---|---|---|---|---|
| 5,335,187 A | * | 8/1994 | Koizumi et al. | 8/400 |
| 5,485,399 A | | 1/1996 | Saigo et al. | 351/178 |
| 5,917,119 A | | 6/1999 | Yamakaji | 8/400 |
| 2002/0030788 A1 | * | 3/2002 | Doshi | 351/162 |
| 2003/0007123 A1 | * | 1/2003 | Broderick et al. | 351/177 |
| 2003/0030772 A1 | * | 2/2003 | Ocampo | 351/162 |

FOREIGN PATENT DOCUMENTS

| | | |
|---|---|---|
| EP | 0 466 451 A1 | 1/1992 |
| EP | 0 710 526 A1 | 5/1996 |
| EP | 0 982 432 A2 | 3/2000 |
| JP | A 1-277814 | 11/1989 |
| JP | A 2000-325840 | 11/2000 |
| JP | A 2001-59950 | 3/2001 |

* cited by examiner

*Primary Examiner*—Jordan M. Schwartz
(74) *Attorney, Agent, or Firm*—Oliff & Berridge, PLC

(57) ABSTRACT

A dyeing system for a lens includes a color measuring device (1) for measuring a color of a colored lens (4a, 4b) used as a sample lens to obtain color data thereof; a determination unit (50) for determining data for dyeing based on the obtained color data; a printer (60) for applying dyes to a base substrate (61) to be used for dyeing; a control part (51) for controlling the printer (60) to adjust application amounts of dyes onto the base substrate (61) based on the determined dyeing data.

7 Claims, 2 Drawing Sheets

DYEING SYSTEM FOR LENS AND ORDERING SYSTEM FOR COLORED LENS

BACKGROUND OF THE INVENTION

1. Field of the Invention

The present invention relates to a dyeing system for a lens and an ordering system for a colored lens.

2. Description of Related Art

As a method for dyeing a plastic lens such as a spectacle plastic lens, for example, a dip dyeing method to dye a lens by dipping it in a dyeing solution has been known. There has also been known a vapor-deposition dyeing method to dye a lens by heating, in a vacuum, a base substrate to be used for dyeing on which a dyeing solution has been applied, thereby sublimating dyes from the base substrate, and vapor-depositing the sublimated dyes on the lens. This method is disclosed in for example Japanese Patent Unexamined Publication No. 1-277814 and Japanese Patent Unexamined Publication No. 2001-59950 which corresponds to European Publication No. 0982432.

For instance, when a customer buys a pair of colored spectacles such as sunglasses, or a spectacle frame with colored lenses, he sometimes chooses a favorite sample lens (color) from among previously prepared sample lenses (color samples) in an optician's shop or the like. In this case, the optician's shop places an order for dyed lenses by informing a color code (a color number) of the chosen sample lens (color) to a lens manufacturer (or a dye works). Then, the lens manufacturer or the dye works dyes lenses in accordance with the received color code and delivers the dyed lenses to the optician's shop. If using the dip dyeing method, the lens manufacturer or dye works adjusts a dyeing solution (additionally, a dipping time and others) based on the received color code. If using the vapor-deposition dyeing method, the lens manufacturer or dye works adjusts an application solution (additionally, a heating time, a distance between a base substrate used for dyeing and lenses, and other conditions) based on the received color code. In the vapor-deposition dyeing method disclosed in European publication No. 0982432, the color code (data) is input in a computer which controls a printer to adjust an application solution based on the input color code (data).

There may be a case where the customer requests the same color as that of a colored spectacle lens that is on sale at a shop or that the customer possess or wears. In this case, if the color code of the lens is unknown, the lens itself has to be sent for use as a sample lens (color) to the lens manufacturer to dye lenses in as the same color as possible as that of the sample lens. However, a person with experience is required to adjust the dyeing solution (the application solution) for dyeing lenses in the same color as that of the sample lens and input the color data thereof. Thus, it would take much time to deliver the dyed lenses of a requested color to the optician's shop.

SUMMARY OF THE INVENTION

The present invention has been made in view of the above circumstances and has an object to overcome the above problems and to provide a dyeing system for a lens and an ordering system for a colored lens, whereby a lens of a desired color can be easily produced.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a dyeing system for a lens, including: color measuring means for measuring a color of a colored lens used as a sample lens to obtain color data thereof; determination means for determining data for dyeing based on the obtained color data; a printer for applying dyes to a base substrate to be used for dyeing; control means for controlling the printer to adjust application amounts of dyes onto the base substrate based on the determined dyeing data.

According to another aspect of the invention, there is provided an ordering system for a colored lens, including: color measuring means for measuring a color of a colored lens used as a sample lens to obtain color data thereof; input means for inputting lens data including at least one of data on the kind of a lens to be dyed and data on a refractive power of the lens; and communication means for transmitting the obtained color data in association with the input lens data to an order receiving terminal through a communication circuit.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

Figure 1:
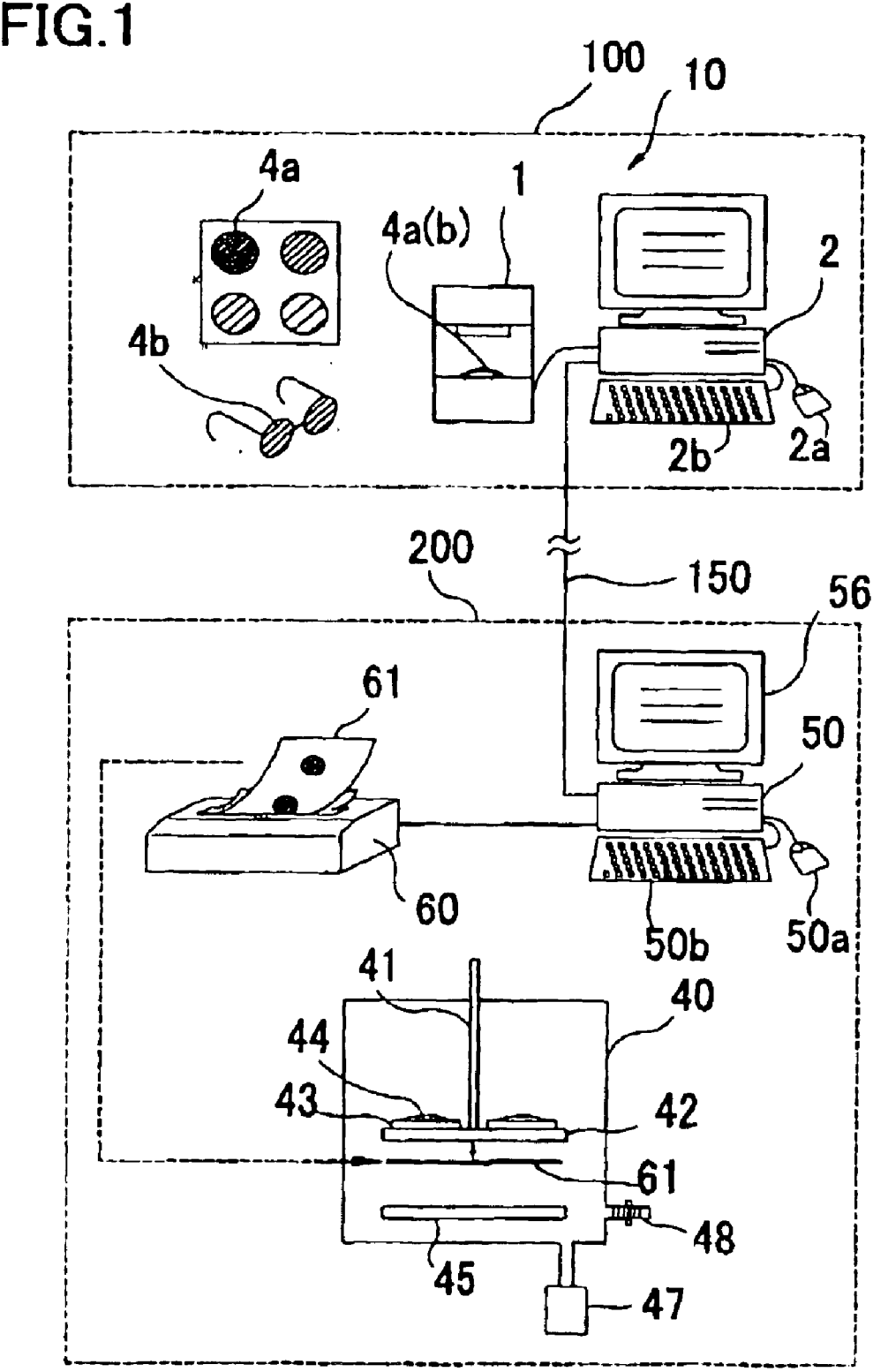
FIG. 1 is a structural view roughly showing of a plastic lens dyeing system in an embodiment according to the present invention.
Figure 2:
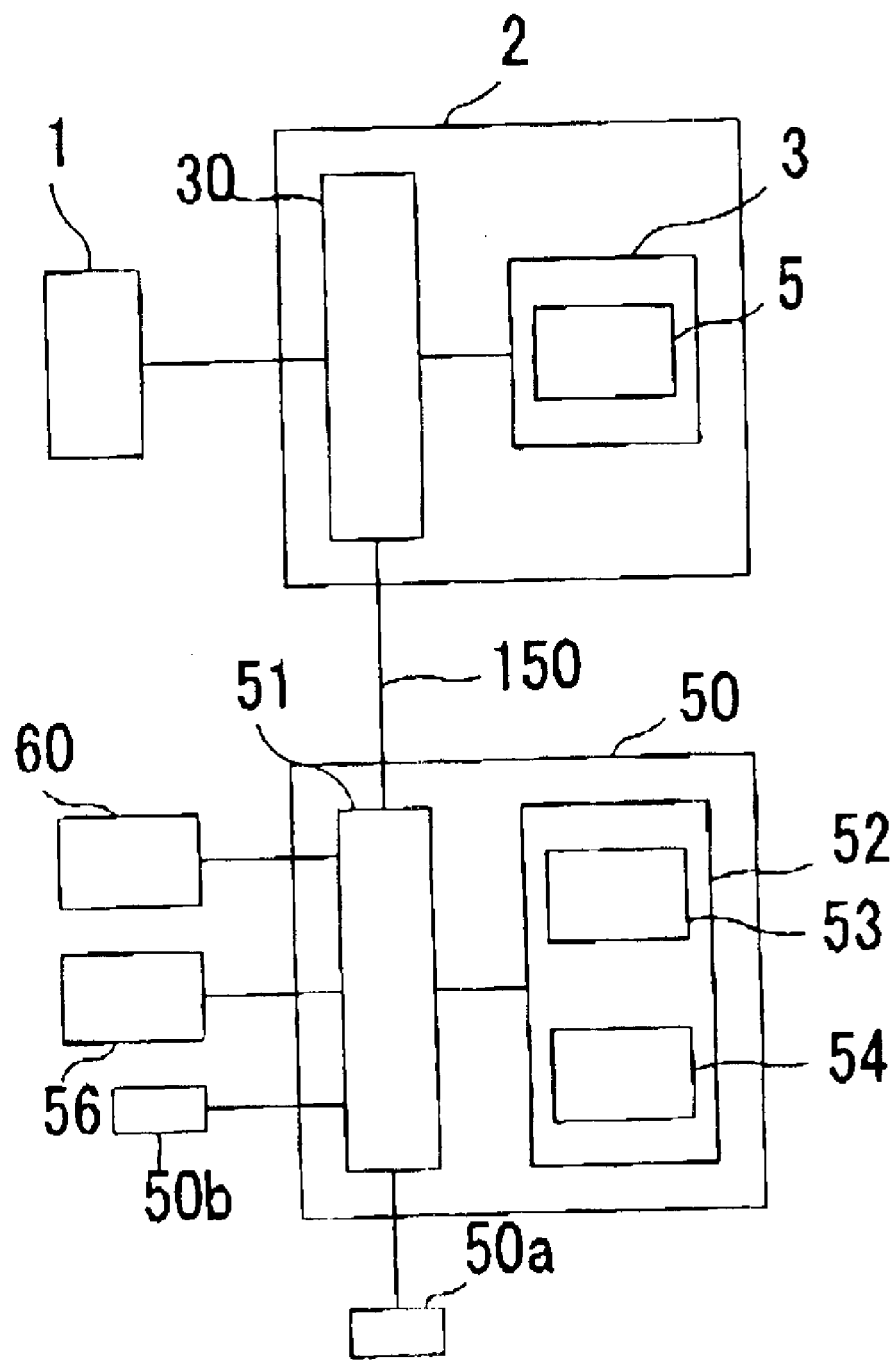
FIG. 2 is a schematic block diagram of a control system in the dyeing system.

A detailed description of a preferred embodiment of a dyeing system for a lens and an ordering system for a colored lens embodying the present invention will now be given referring to the accompanying drawings. FIG. 1 is a structural view of the lens dyeing system in the present embodiment. FIG. 2 is a schematic block diagram of a control system in the dyeing system. It is to be noted that the present invention can be applied to a dyeing system for spectacle lenses as well as a dyeing system for other lenses such as ophthalmic lenses including contact lenses, and further optical lenses.

Numeral 10 denotes a system for placing an order for colored spectacle lenses, which is located in an optician's shop 100. This system 10 includes a color measuring device (colorimeter) 1 for measuring the color of a sample lens 4a (color sample) or a colored spectacle lens 4b on sale at the shop 100 and a computer 2 serving as an ordering terminal. The color measuring device 1 is connected to the computer 2 to transmit data on color (data on spectral transmittance) of the lens 4a or 4b measured by the color measuring device 1.

The color measuring device 1 used in the present embodiment is internally provided with a halogen lamp and constructed such that light of the halogen lamp is made incident into an integrating sphere and then the light emerging from the integrating sphere is made to transmit a lens to be measured. The transmitted light is spectrally divided by means of a diffraction grating, and a photodiode array measures the intensity of light of each wavelength to determine a spectral transmittance of the lens. It is to be noted that a commonly used color measuring device may be utilized as well as the above device.

The computer 2 is provided with a control part 30 including a CPU and others and a hard disc 3. The computer 2 is capable of storing the color data transmitted from the color measuring device 1 in the hard disc 3. The hard disc 3 stores a transmission program 5 for transmitting data to a lens manufacturer 200.

The computer 2 is connected to a computer 50 serving as an order receiving terminal placed in the lens manufacturer (or a dye works) 200 through a communication network 150 such as a telephone line or the like. The computers 2 and 50 each have a function of transmitting and receiving data concerning an order and others. The communication network 150 is for example the Internet, an intranet, a wide area network (WAN), a local area network (LAN), etc. In the lens manufacturer 200, an ink jet printer 60 connected to the computer 50 and a lens dyeing machine 40 are placed.

The computer 50 is provided with a control part 51 including a CPU and others and a hard disc 52. This hard disc 52 stores a computer color matching (CCM) program 53 and a lot of dyeing information 54. The CCM program 53 is a program to determine dyeing data needed for dyeing a lens in a desired color.

The dyeing information 54 includes data on the kind of dyes (red, blue, yellow, black, etc.) to be discharged from the printer 60 and applied (printed) onto a base substrate or the like, data on a distribution ratio (i.e., an application amount ratio or a discharge amount ratio) of the dyes, data on the spectral transmittance of each lens dyed based on each distribution ratio, and other data. The distribution ratio data includes as much data as possible about distribution ratio patterns. The spectral transmittance data also corresponds to each distribution ratio pattern data. These pieces of the dyeing information 54 are previously determined quantitatively and stored in the hard disc 52.

When the CCM program 53 is executed, a display 56 is caused to display an operating screen for determination of the dyeing data. This operation is made by use of a mouse 50a and a keyboard 50b which are connected to the computer 50.

A commercially available ink jet printer may be used as the printer 60. This printer 60 is controlled by the computer 50 to discharge sublimatable dyes, which are applied (printed) onto a dyeing base substrate (a print base substrate) 61 based on the determined dyeing data. The base substrate 61 may be high-quality white PPC paper which is commercially available. As the sublimatable dyes, any available dyes, for example, disperse dye inks (red, blue, yellow, black, etc.) manufactured by UPEPO Co., may be used.

Next, the structure of the dyeing machine 40 is explained. This machine 40 is formed at the upper portion with an unillustrated port through which the lens 44 and the base substrate 61 are taken in/out of the machine 40. Numeral 41 is a support rod which is operable to vertically move a table 42 for mounting thereon the lens 44, so that the table 42 is brought close to the port. The table 42 is formed with two circular openings not illustrated, arranged symmetrically with respect to the support rod 41. Each opening has a larger size than the diameter of the lens 44 to be dyed. Numeral 43 is a cylindrical lens holder which is mounted surrounding each opening. In the holder 43, the lens 44 is set with its back surface (which will face an eye of a customer when he wears a pair of spectacles with the lens 44) facing toward the opening. The base substrate 61 is attached to the underside of the table 42, without contact with the lens 44, so that the sublimatable dyes applied (printed) on the base substrate 61 are positioned correspondingly with the openings. Thus, the dyes when sublimated are allowed to reach the lens 44 through the openings.

The plastic lens 44 to be dyed with the sublimatable dyes is a lens made of a material such as polycarbonate resin (e.g., diethylene glycol bisallyl carbonate polymer (CR-39)), polyurethane resin, allyl resin (e.g., allyl diglycol carbonate and its copolymer, diallyl phthalate and its copolymer), fumaric acid resin (e.g., benzyl fumarate copolymer), styrene resin, polymethyl acrylate resin, fibrous resin (e.g., cellulose propionate), or the like.

Numeral 45 is a halogen lamp for heating the base substrate 61 to sublimate the dyes applied (printed) on the base substrate 61. When the halogen lamp 45 is turned on to heat the base substrate 61, the dyes are sublimated. Numeral 47 is a rotary pump which is used for producing an almost vacuum in the dyeing machine 40. Numeral 48 is a leak valve, which is opened to return the inside of the machine 40 from the almost vacuum to atmospheric pressure.

Next, explanation will be made on the procedures from selection of a color sample at the optician's shop 100 to dyeing of a lens in the manufacturer 200.

A customer chooses a favorite lens (color) from among plural sample lenses 4a and colored spectacle lenses 4b. The color of the chosen lens is measured by the color measuring device 1.

The color measuring device 1 transmits data on the color of the lens measured to the computer 2. Upon receipt of the color data, the control part 30 temporarily stores the data in the hard disc 3. This hard disc 3 has previously stored data about many lenses (for example, data on the kind of a lens such as CR-39 and data on refractive power (lens power)). It is to be noted that the lens data is input by use of a keyboard 2b or the like connected to the computer 2 and stored in the hard disc 3. When the transmission program 5 is executed, the color data stored in the hard disc 3 and the lens data suitable for the customer are transmitted in association with each other to the computer 50 in the manufacturer 200 through the communication network 150. The control part 51 stores the received color data and lens data in the hard disc 52. It is to be noted that the lens data may be input at the time of transmission of the color data and transmitted in association with the color data.

Upon execution of the CCM program 53, the control part 51 determines the dyeing data based on the dyeing information 54 stored in the hard disc 52 and the color data transmitted from the computer 2.

More specifically, the control part 51 compares the received spectral transmittance data with the previously stored spectral transmittance data to determine if there is a substantial match. If a substantial match is found, the data on a distribution ratio pattern corresponding to the matching stored spectral transmittance is determined as dyeing data. If no substantial match is found, the control part 51 calculates spectral transmittance of a dyed lens by arithmetical operation of the CCM program 53 by changing a distribution ratio. If the received spectral transmittance matches the calculated spectral transmittance, the data on a distribution ratio pattern corresponding to the matching calculated spectral transmittance is determined as dyeing data. It is to be noted that a try and error method or the like is used in the arithmetical operation.

Based on the determined dyeing data, the control part 51 controls the printer 60 to adjust the amount of application (the amount of discharge) of the dyes and then apply (print) the dyes in two circular shapes on the base substrate 61 so that each circular shape has a slightly larger diameter than that of the lens 44 to be dyed.

The base substrate 61 on which the dyes have been applied (printed) is attached with the dye-applied (printed) surface facing up to the underside of the table 42 in the dyeing machine 40. The lens 44 is set on the holder 43, and then the pump 47 is activated to produce a vacuum in the dyeing machine 40. The lamp 45 is turned on to heat the base substrate 61, thus sublimating the dyes. The sublimated dyes are deposited on the lens 44. The heating temperature may be determined so as to completely sublimate (evaporate) the dyes from the base substrate 61. The temperature on the paper is preferably 100° C. or more and as high as possible in the temperature range that causes no deformation of the lens 44.

After completion of the heating, the valve 48 is opened, returning the inside of the dyeing machine 40 to atmospheric pressure. On the lens 44 taken out from the machine 40, the sublimated dyes have been vapor-deposited, but may come off if left as it is. To avoid such deterioration, the lens 44 is put in an oven not illustrated and heated at normal pressures to fix the dyes on the lens 44.

It is to be noted that color development would become insufficient if the heating temperature of the oven is less than 90° C., while lens deformation may be caused if it exceeds 150° C. In this view, the heating temperature is preferably determined at 90° C. or more and 150° C. or less. More preferably, it is 110° C. or more and 130° C. or less. Furthermore, color development would become insufficient if the heating time is less than 30 min., while dye degeneration often occurs if it exceeds 3 hours. Thus, the heating time is preferably determined at 30 min. or more and 3 hours or less, more preferably, 30 min. or more and 2 hours or less.

In the above embodiment, the color data is obtained from the color sample or the like. Alternatively, for instance, the color data may be obtained from a piece of colored spectacles that a customer possesses or wears and the dyeing data is determined based on the color data.

Furthermore, there is also a spectacle lens with a surface treated with antireflective coating (hereinafter referred to as "AR coat") or the like. Accordingly, the information on dyeing results which are affected by the surface treatment such as the AR coat or the like may be stored as one of the dyeing information 54. In this case, after measurement of the color data of a lens by the color measuring device 1, the effect that the lens has been applied with the AR coat or the like is converted into data format and such data is transmitted along with the color data from the computer 2 to the computer 50. The control part 51 determines the dyeing data suitable for the lens applied with the AR coat by using the CCM program 53 and the dyeing information 54. As a result, even when the spectacle lens surface-treated with the AR coat or the like is used as a sample lens, a target lens can be dyed in consideration of the surface treatment.

Based on the received lens data, furthermore, an adequate lens may be automatically selected from a stock of undyed lenses. The received lens data may simply be displayed on the display 56. It is also possible to automatically select an adequate lens from a stock of dyed lenses based on the distribution ratio pattern data corresponding to the received lens data and the received color data.

As explained above, according to the present invention, the data for dyeing is determined based on the color data obtained by measurement, so that a lens can easily be dyed in a desired color.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A dyeing system for a lens to be dyed, including;
    color measuring means for measuring a color of a colored lens to obtain color data of the colored lens;
    determination means for determining data for dyeing the lens to be dyed based on the obtained color data;
    a printer for applying dyes to a base substrate to be used for dyeing; and
    control means for controlling the printer to adjust application amounts of dyes onto the base substrate based on the determined dyeing data,
    wherein the color measuring means obtains data on spectral transmittance as the color data, and
    the determination means includes memory means which stores dyeing information needed for determining the dyeing data, the dyeing information including data on the kind of the dyes, data on distribution ratios of the dyes, and data on spectral transmittance corresponding to each distribution ratio, the determination means compares the obtained spectral transmittance data with the stored spectral transmittance data to determination the dyeing data.

2. The dyeing system according to claim 1, wherein the printer includes an ink jet printer, and the control means adjusts discharge amounts of the dyes to be discharged from the printer.

3. The dyeing system according to claim 1, further including communication means for transmitting the color data obtained by the color measuring means to the determination means through a communication network.

4. The dyeing system according to claim 1, wherein the determination means compares the obtained spectral transmittance data with spectral transmittance data of a dyed lens, which is mathematically calculated by changing the distribution ratio.

5. The dyeing system according to claim 1, wherein the dyeing information includes information on effects of a lens surface treatment on a dyeing result.

6. The dyeing system according to claim 1, further including dyeing means which heats the base substrate on which the dyes are applied by the printer to sublimate and deposit the dyes on a plastic lens to be dyed.

7. The dyeing system according to claim 1, wherein the dyeing information includes information on effects of a lens surface treatment on a color measuring result.

* * * * *